United States Patent
Ho et al.

(10) Patent No.: US 10,070,434 B2
(45) Date of Patent: Sep. 4, 2018

(54) USER EQUIPMENT AND TIMING ADVANCE VALUE UPDATING METHOD THEREOF

(71) Applicant: MEDIATEK INC., Hsin-Chu (TW)

(72) Inventors: Sheng-Yi Ho, Yilan County (TW);
Shen-Chieh Tung, Taoyuan (TW);
Chia-Chun Hsu, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/904,850

(22) PCT Filed: Aug. 7, 2015

(86) PCT No.: PCT/CN2015/086321
§ 371 (c)(1),
(2) Date: Jan. 13, 2016

(87) PCT Pub. No.: WO2016/019895
PCT Pub. Date: Feb. 11, 2016

(65) Prior Publication Data
US 2017/0142708 A1 May 18, 2017

Related U.S. Application Data

(60) Provisional application No. 62/034,936, filed on Aug. 8, 2014.

(51) Int. Cl.
*H04W 72/04* (2009.01)
*H04W 76/04* (2009.01)
(Continued)

(52) U.S. Cl.
CPC ..... *H04W 72/0446* (2013.01); *H04W 72/042* (2013.01); *H04W 72/0413* (2013.01);
(Continued)

(58) Field of Classification Search
None
See application file for complete search history.

(56) References Cited

U.S. PATENT DOCUMENTS 8,565,099 B2 * 10/2013 Lindstrom .......... H04W 76/027
370/242
2011/0319065 A1 * 12/2011 Dalsgaard ............ H04L 1/0027
455/418
(Continued)

FOREIGN PATENT DOCUMENTS

CN 101772150 A 7/2010
CN 102550110 A 7/2012
(Continued)

OTHER PUBLICATIONS

International Search Report corresponding to Application No. PCT/CN2015/086321; dated Nov. 6, 2015.
(Continued)

*Primary Examiner* — James P Duffy
(74) *Attorney, Agent, or Firm* — Cantor Colburn LLP

(57) ABSTRACT

A user equipment and a timing advance value updating method thereof are provided. The UE determines that a scheduling request transmission counter reaches a maximum number of SR transmission and determines whether a time alignment timer is still running after the scheduling request transmission counter reaches the maximum number of SR transmission. If the time alignment timer is still running, the UE drops the time alignment timer.

12 Claims, 2 Drawing Sheets

(51) Int. Cl.
*H04W 72/14* (2009.01)
*H04W 74/08* (2009.01)
*H04W 76/27* (2018.01)

(52) U.S. Cl.
CPC ....... *H04W 72/14* (2013.01); *H04W 74/0833* (2013.01); *H04W 76/046* (2013.01); *H04W 76/27* (2018.02)

(56) References Cited

U.S. PATENT DOCUMENTS

2012/0190376 A1* 7/2012 Rosa ............... H04W 72/1284
455/450
2014/0355504 A1* 12/2014 Du ................... H04W 52/0216
370/311

FOREIGN PATENT DOCUMENTS

| WO | 2013079104 A1 | 6/2013 |
| WO | 2014059671 A1 | 4/2014 |

OTHER PUBLICATIONS

Qualcomm Incorporated "LTE UE Uplink Out-of-Sync Handling," 3GPP TSG-RAN WG2 Meeting #80; Nov. 16, 2012, pp. 1-5.
Written Opinion of the International Searching Authority corresponding to Application No. PCT/CN2015/086321; dated Nov. 6, 2015.
SIPO Office Action for corresponding CN Application No. 201580001277.9; dated May 3, 2018.

* cited by examiner

USER EQUIPMENT AND TIMING ADVANCE VALUE UPDATING METHOD THEREOF

CROSS-REFERENCES TO RELATED APPLICATIONS

This is the U.S. national stage of application No. PCT/CN2015/086321, filed on Aug. 7, 2015. Priority under 35 U.S.C. § 119(a) and 35 U.S.C. § 365(b) is claimed from U.S. Provisional Application Ser. No. 62/034,936 filed on Aug. 8, 2014, the disclosure of which is also incorporated herein by reference.

BACKGROUND OF THE INVENTION

Field of the Invention

The present invention relates to a user equipment and a timing advance (TA) value updating method thereof. More particularly, the handheld device executes the TA value updating method for updating a new TA value after the scheduling request (SR) transmission counter reaches the maximum number of SR transmission if the time alignment timer is still running.

Descriptions of the Related Art

The telecommunication technology has been developed very rapidly. To satisfy users' demands for communication, various telecommunication standards have been developed. The 3rd Generation Partnership Project Long Term Evolution (3GPP LTE) communication system is a rapidest developing communication system recently, and user equipments (UEs) supporting the 3GPP LTE communication system have been gradually used in daily communications.

In the 3GPP LTE communication system, the uplink transmission adopts the Discrete Fourier Transform (DFT)-Spread Orthogonal Frequency-Division Multiplexing (OFDM) scheme in which uplink subcarrier orthogonality at the base station (i.e. eNB) relies on individual uplink time alignment control for each UE. Conceptually, the uplink time alignment value compensates signal propagation delay.

The uplink time alignment control is achieved by providing a timing advance (TA) value for each UE. The UEs can acquire/update the TA value in two ways as defined in the 3GPP LTE specification. One is through the random access procedure; the other is through the downlink medium access control (MAC) protocol data unit (PDU). In the random access procedure, the UE gets a TA command in the random access response message and the TA command gives an absolute TA value. On the other hand, in the downlink MAC PDU, the eNB can compose a TA Command MAC control element to adjust current TA value.

After receiving the TA command (also referring to the TA Command MAC control element) and applying the TA command, the UE will start or restart a time alignment timer and regard itself as uplink time aligned when the time alignment timer is running. In general, the eNB periodically sends the TA command to the UE so that the UE applies the TA value indicating therein and restarts its timing alignment timer.

However, in some scenarios (e.g. poor signal quality), the UE could not successfully request uplink (UL) resource from the eNB by sending a scheduling request (SR) to the eNB, and needs to resend the SR continuously. In such a case, if the retransmission number of one pending SR reaches a maximum number of SR transmission (e.g. the parameter dsr-TransMax defined in the 3GPP LTE specification), the UE notifies a radio resource control (RRC) to release allocated resources of a physical uplink control channel (PUCCH) and a sounding reference symbol (SRS), clears configured downlink assignments and uplink grants, and initiates a random access procedure. As long as the time alignment timer is still running after the retransmission number of the pending SR reaches the maximum number of SR transmission, the TA command included in the random access response message would be ignored during the random access procedure; as a result, the new TA value indicated by the TA command would not be applied.

In this situation, the third message (i.e. the Msg3 defined in the 3GPP LTE specification) of the random access procedure transmitted to the eNB based on the old TA value (which is probably obsolete and wrong for use) may not be decoded successfully by the eNB and will cause the random access contention resolution to be failed. Such dilemma continues until the time alignment timer expires or the consecutive failure times of the random access procedure reach a maximum number of preamble transmission, making the radio link failure occur and the UE try to recover the connection. If the eNB configured a long TA value, even infinity, the connection recovery takes a long time, up to few seconds, which impact the user experience.

Accordingly, an urgent need exists in the art to provide a timing advance (TA) value updating mechanism to prevent the TA command included in the random access response message from being ignored during the random access procedure since the time alignment timer is still running.

SUMMARY OF THE INVENTION

The objective of the present invention is to provide a timing advance (TA) value updating mechanism which drops the time alignment timer after the retransmission number of one pending SR reaches the maximum number of SR transmission. Therefore, the TA value updating mechanism of the present invention can effectively prevent the TA command included in the random access response message from being ignored during the random access procedure.

To achieve the aforesaid objective, the present invention discloses a user equipment. The user equipment comprises a transceiver and a processor electrically connected to the transceiver. The processor is configured to receives a timing advance (TA) command from a base station via the transceiver, to retrieve a TA value from the TA command and applying the TA value, to start a time alignment timer once the TA value is applied, to determine that a scheduling request (SR) transmission counter reaches a maximum number of SR transmission, to determine whether the time alignment timer is still running after the scheduling request transmission counter reaches the maximum number of SR transmission, and to drop the time alignment timer if the time alignment timer is still running.

In addition, the present invention further discloses a timing advance (TA) value updating method for use in a user equipment. The user equipment comprises a transceiver and a processor. The TA value updating method executed by the processor and comprising the following steps: (a) receiving a TA command from a base station via the transceiver; (b) retrieving a TA value from the TA command and applying the TA value; (c) starting a time alignment timer once the TA value is applied; (d) determining that a scheduling request transmission counter reaches a maximum number of SR transmission; (e) determining whether the time alignment timer is still running after the scheduling request transmission counter reaches the maximum number of SR transmission; and (f) dropping the time alignment timer if the time alignment timer is still running.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a user equipment (UE) and a timing advance (TA) value updating method thereof. In the following description, the present invention will be explained with reference to embodiments thereof. It shall be appreciated that, theses embodiments of the present invention are not intended to limit the present invention to any specific environment, applications or implementations described in these embodiments. Therefore, the description of these embodiments is only for purpose of illustration rather than to limit the present invention and the scope claimed in this application shall be governed by the claims. Additionally, in the following embodiments and the attached drawings, elements unrelated to the present invention are omitted from depiction; and dimensional relationships among individual elements in the attached drawings are illustrated only for ease of understanding, but not to limit the actual scale.

Figure 1:
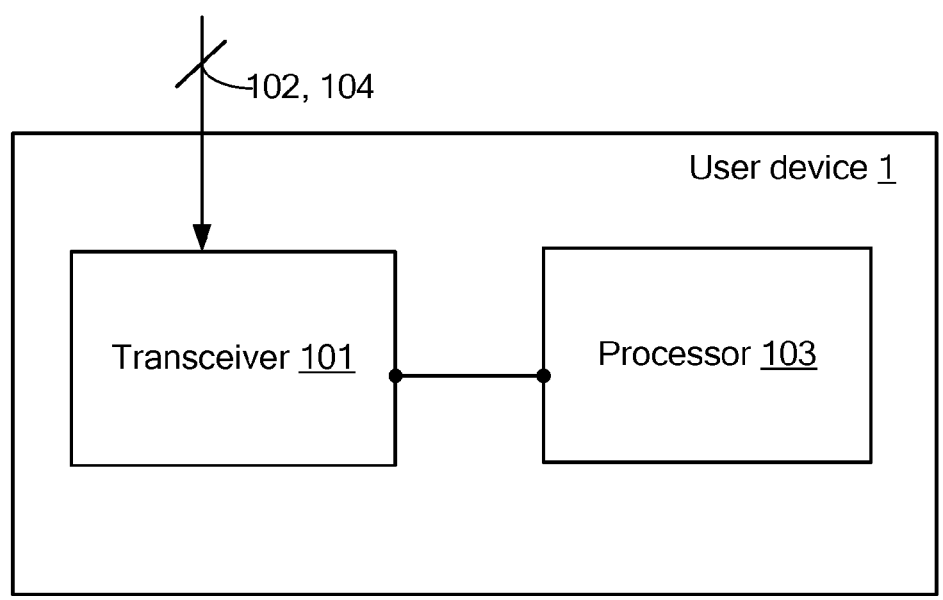
FIG. 1 is a schematic view of a user equipment 1 according to the first embodiment to the fourth embodiment of the present invention.

The first embodiment of the present invention is depicted in FIG. 1, which is a schematic diagram of a UE 1 of the present invention. The UE 1 may be a smart phone, a tablet computer, or any other device with communication capability. It shall be noted that for the purpose of simplicity, other elements of the UE 1, such as a memory, a storage, a display module, an antenna module, a power module and elements less related to the present invention, are all omitted from depiction herein.

The UE 1 comprises a transceiver 101 and a processor 103 electrically connected to the transceiver 101. The processor 103 receives a timing advance (TA) command 102 from a base station (i.e. eNB) via the transceiver 101. The TA command 102 may be carried in the random access response message during the random access procedure or in the downlink MAC PDU. Afterwards, the processor 103 retrieves a TA value from the TA command 102 and applies the TA value. Then, the processor 103 starts a time alignment timer once the TA value is applied and processes the uplink (UL) transmission (e.g. a scheduling request (SR) transmission, etc.) if the time alignment timer is running.

In a case that the UE 1 could not successfully request UL resource from the base station by sending the SR, the processor 103 determines whether a SR transmission counter reaches a maximum number of SR transmission (e.g. the parameter dsr-TransMax defined in the 3GPP LTE specification). Specifically, the SR transmission counter increases by 1 every time the UE 1 resend the pending SR. Once there is no SR pending, the UE 1 shall set the SR transmission counter to 0. After determining that the scheduling request transmission counter reaches the maximum number of SR transmission, the processor 103 further determines whether the time alignment timer is still running. If the time alignment timer is still running, the processor 103 drops the time alignment timer.

It shall be appreciated that the base station mentioned herein may be the primary cell (PCell) in a timing advance group (TAG), and those of ordinary skill in the art can easily understand the aforementioned operations executed by the processor 101 is adopted for the PCell, but theses operation may also be adopted for any cells in the same TAG as the PCell. Since those of skill in the art would appreciate how the similar operations are performed on any cells in the TAG based on the descriptions herein and the contents described in the 3GPP LTE specification, it will not be further described in detail.

The second embodiment of the present invention is also depicted in FIG. 1, which is an extension of the first embodiment of the present invention. In this embodiment, once the SR transmission counter reaches the maximum number of SR transmission, the processor 103 immediately determines whether the time alignment timer is still running. If the time alignment timer is still running, the processor 103 drops the time alignment.

Specifically, in practice, the processor 103 can drop the time alignment by stopping the time alignment timer directly. Afterwards, the processor 103 will perform the corresponding actions when the SR transmission counter reaches the maximum number of SR transmission as defined described in the 3GPP LTE specification, e.g., notifying the RRC to release allocated resources of a physical uplink control channel (PUCCH) and a sounding reference symbol (SRS), clearing configured downlink assignments and uplink grants, and initiating a random access procedure.

In another implement, the processor 103 can drop the time alignment by setting the time alignment timer as expired if the time alignment timer is still running. After the time alignment timer is set as expired, the processor 103 will perform the corresponding actions when the time alignment timer expires defined described in the 3GPP LTE specification, e.g. notifying the RRC to release allocated resources of the PUCCH and the SRS, clearing configured downlink assignments and uplink grants, and initiating a random access procedure. By these ways as aforementioned, in the later random access procedure, the TA command included in the random access response message would not be ignored, and the new TA value indicated by the TA command would be applied since the previous time alignment timer has been stopped or expired.

Please still refer to FIG. 1 for the third embodiment of the present invention. This embodiment is also an extension of the first embodiment of the present invention. When the SR transmission counter reaches the maximum number of SR transmission, the processor 103 notifies the RRC to release allocated resources of the PUCCH and the SRS, clears configured downlink assignments and uplink grants, and initiates a random access procedure.

In this embodiment, the processor 103 further determines whether the random access procedure has been consecutively failed for a specific number of times. The specific number is smaller than a maximum number of preamble transmission (e.g. the parameter preambleTransMax defined in the 3GPP LTE specification). Then, the processor 103 determines whether the time alignment timer is still running when the random access procedure has been consecutively failed for the specific number of times. If the time alignment timer is still running, the processor 103 drops the time alignment timer by stopping the time alignment timer. Thus, in the next random access procedure, the TA command included in the random access response message would not be ignored, and the new TA value indicated by the TA command would be applied since the previous time alignment timer has been stopped.

The fourth embodiment of the present invention is also depicted in FIG. 1, which is also an extension of the first embodiment of the present invention. Similarly, in this embodiment, when the SR transmission counter reaches the maximum number of SR transmission, the processor 103 notifies the RRC to release allocated resources of the PUCCH and the SRS, clears configured downlink assignments and uplink grants, and initiates a random access procedure.

Unlink to the previous embodiment, in this embodiment, after receiving a next TA command 104 from the base station via the transceiver and retrieving a next TA value from the next TA command 104 during the random access procedure, the processor 103 determines whether the time alignment timer is still running once the next TA value is retrieved from the next TA command 104. If the time alignment timer is still running, the processor 103 drops the time alignment timer by directly applying the next TA value.

Afterwards, the processor 103 restarts the time alignment timer once the next TA value is applied. In some situations, a contention resolution of the random access procedure may fail. When the contention resolution of the random access procedure is not successful, the processor 103 will stop the time alignment timer, and then reapply the previous TA value to restart the time alignment timer. Thus, in this embodiment, the processor 103 may reapply the previous TA value when the contention resolution of the random access procedure is not successful and restart the time alignment timer once the previous TA value is reapplied.

Figure 2:
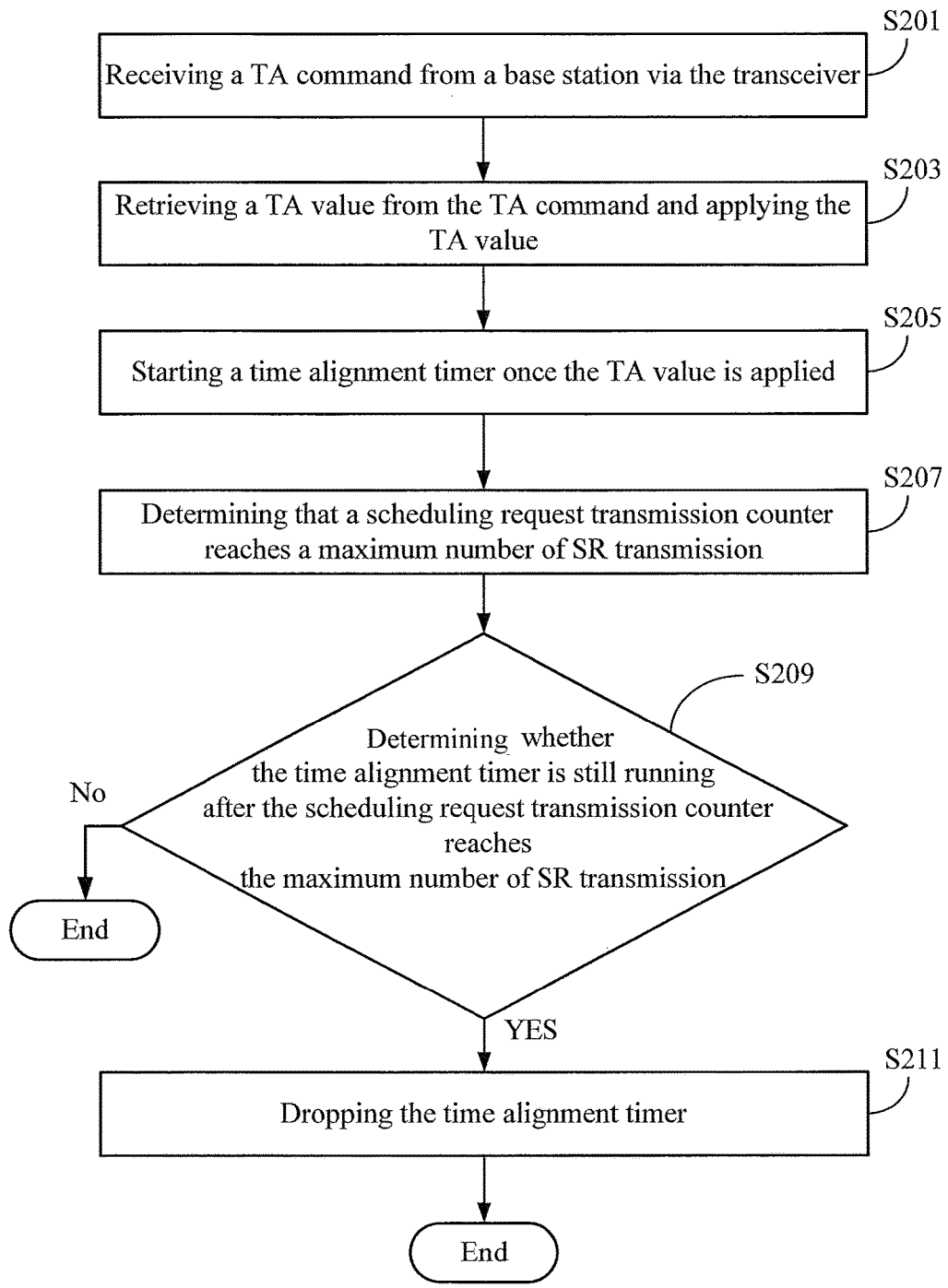
FIG. 2 is a flowchart diagram of a timing advance (TA) value updating method according to the fifth embodiment of the present invention.

The fifth embodiment of the present invention is a TA value updating method, a flow chart of which is shown in FIG. 2. The TA value updating method is for use in a UE, e.g., the UE 1 of the aforesaid embodiments and executed by a processor of the UE. First, step S201 is executed to receive a TA command from a base station via the transceiver. Then, step S203 is executed to retrieve a TA value from the TA command and apply the TA value. Step S205 is executed to start a time alignment timer once the TA value is applied.

Afterwards, step S207 is executed to determine that a scheduling request transmission counter reaches a maximum number of SR transmission. Next, step S209 is executed to determine whether the time alignment timer is still running after the scheduling request transmission counter reaches the maximum number of SR transmission. If the time alignment timer is still running, step S211 is then executed to dropping the time alignment timer if the time alignment timer is still running, and then the updating method ends up. Otherwise, the TA value updating method ends up if the time alignment timer is not running.

It shall be understood that when the processor receives a new TA command from the base station via the transceiver as depicted in step S201, then the TA value updating method of the present invention restarts automatically so that the processor executes the steps illustrated in FIG. 2. In addition, for the purpose of simplicity, the step S207 is presumed that the processor determines the scheduling request transmission counter reaches a maximum number of SR transmission after the UE could not successfully request UL resource from the base station by sending the SR for the times as the configured maximum number of SR transmission; however, those of ordinary skill in the art would appreciate that the processor will continuously send the pending SR if the scheduling request transmission counter is smaller the maximum number of SR transmission and sets the scheduling request transmission counter to 0 if there is no SR pending.

In another embodiment, step S209 is executed to determine whether the time alignment timer is still running once the scheduling request transmission counter reaches the maximum number of SR transmission. In this case, step S211 is executed to dropping the time alignment timer by stopping the time alignment timer, or by setting the time alignment timer as expired.

In another embodiment, after step S207, the TA value updating method further comprises the steps: notifying an RRC to release allocated resources of a PUCCH and an SRS; clearing configured downlink assignments and uplink grants; and initiating a random access procedure. Moreover, step S209 includes the steps: determining that the random access procedure has been consecutively failed for a specific number of times, wherein the specific number is smaller than a maximum number of preamble transmission; and determining whether the time alignment timer is still running once the random access procedure has been consecutively failed for the specific number of times. In such a case, step S211 is executed to dropping the time alignment timer by stopping the time alignment timer.

Besides, in another embodiment, after step S207, the TA value updating method further comprises the steps: notifying an RRC to release allocated resources of a PUCCH and a SRS; clearing configured downlink assignments and uplink grants; and initiating a random access procedure to receive a next TA command from the base station via the transceiver and retrieve a next TA value from the next TA command. In such a case, step S209 is executed to determine whether the time alignment timer is still running once the next TA value is retrieved from the next TA command, and step S211 is executed to drop the time alignment timer by directly applying the next TA value if the time alignment timer is still running. In addition, after step S211, the TA value updating method further comprises the steps: restarting the time alignment timer once the next TA value is applied; stopping the time alignment timer when a contention resolution of the random access procedure is not successful; applying the TA value; and restarting the time alignment timer once the TA value is applied.

In addition to the aforesaid steps, the TA value updating method of the above embodiments can also execute all the operations and corresponding functions set forth in the first to fourth embodiments. How to execute these operations and functions will be readily appreciated by those of ordinary skill in the art based on the explanation of the first to fourth, and thus will not be further described herein.

According to the above descriptions, the TA value updating mechanism of the present invention drops the time alignment timer after the retransmission number of one pending SR reaches the maximum number of SR transmission so as to prevent the TA command included in the random access response message from being ignored during the later random access procedure. By the TA value updating mechanism of the present invention, the delay of recovering from uplink problem with long or infinite TA value can be avoided or shorten; consequently, the impact on the user experience no longer exists or could be significantly reduced.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment comprising:
a transceiver; and
a processor, being electrically connected to the transceiver and configured to execute the following steps:
(a) receiving a timing advance (TA) command from a base station via the transceiver;
(b) retrieving a TA value from the TA command and applying the TA value;
(c) starting a time alignment timer once the TA value is applied;
(d) determining that a scheduling request (SR) transmission counter reaches a maximum number of SR transmission;
(e) determining whether the time alignment timer is still running after the scheduling request transmission counter reaches the maximum number of SR transmission; and
(f) dropping the time alignment timer once determining that the time alignment timer is still running without being approved by the base station so as to prevent a subsequent TA command included in a random access response message from being ignored in a random access procedure.

2. The user equipment as claimed in claim 1, wherein the step (e) is determining whether the time alignment timer is still running once the scheduling request transmission counter reaches the maximum number of SR transmission.

3. The user equipment as claimed in claim 2, wherein the step (f) is dropping the time alignment timer by stopping the time alignment timer if the time alignment timer is still running.

4. The user equipment as claimed in claim 2, wherein the step (f) is dropping the time alignment timer by setting the time alignment timer as expired if the time alignment timer is still running.

5. The user equipment as claimed in claim 1, wherein after the step (d), the processor further executes the following steps:
notifying a radio resource control (RRC) to release allocated resources of a physical uplink control channel (PUCCH) and a sounding reference symbol (SRS);
clearing configured downlink assignments and uplink grants; and
initiating the random access procedure;
wherein the step (e) further comprises the following steps:
determining that the random access procedure has been consecutively failed for a specific number of times, wherein the specific number is smaller than a maximum number of preamble transmission; and
determining whether the time alignment timer is still running when the random access procedure has been consecutively failed for the specific number of times;
wherein the step (f) is dropping the time alignment timer by stopping the time alignment timer if the time alignment timer is still running.

6. The user equipment as claimed in claim 1, wherein after the step (d), the processor further executes the following steps:
notifying a radio resource control (RRC) to release allocated resources of a physical uplink control channel (PUCCH) and a sounding reference symbol (SRS);

clearing configured downlink assignments and uplink grants; and
initiating the random access procedure to receive a next TA command from the base station via the transceiver and to retrieve a next TA value from the next TA command;
wherein the step (e) is determining whether the time alignment timer is still running once the next TA command is retrieved from the next TA command;
wherein the step (f) is dropping the time alignment timer by directly applying the next TA value if the time alignment timer is still running, and after the step (f), the processor further executes the following steps:
restarting the time alignment timer once the next TA value is applied;
stopping the time alignment timer when a contention resolution of the random access procedure is not successful;
applying the TA value; and
restarting the time alignment timer once the TA value is applied.

7. A timing advance (TA) value updating method for a user equipment, the user equipment comprising a transceiver and a processor, the TA value updating method executed by the processor and comprising the following steps:
(a) receiving a TA command from a base station via the transceiver;
(b) retrieving a TA value from the TA command and applying the TA value;
(c) starting a time alignment timer once the TA value is applied;
(d) determining that a scheduling request transmission counter reaches a maximum number of SR transmission;
(e) determining whether the time alignment timer is still running after the scheduling request transmission counter reaches the maximum number of SR transmission; and
(f) dropping the time alignment timer once determining that the time alignment timer is still running without being approved by the base station so as to prevent a subsequent TA command included in a random access response message from being ignored in a random access procedure.

8. The TA value updating method as claimed in claim 7, the step (e) is determining whether the time alignment timer is still running once the scheduling request transmission counter reaches the maximum number of SR transmission.

9. The TA value updating method as claimed in claim 8, wherein the step (f) is dropping the time alignment timer by stopping the time alignment timer if the time alignment timer is still running.

10. The TA value updating method as claimed in claim 8, wherein the step (f) is dropping the time alignment timer by setting the time alignment timer as expired if the time alignment timer is still running.

11. The TA value updating method as claimed in claim 7, wherein after the step (d), the TA value updating method further comprises the following steps:
notifying a radio resource control (RRC) to release allocated resources of a physical uplink control channel (PUCCH) and a sounding reference symbol (SRS);
clearing configured downlink assignments and uplink grants; and
initiating the random access procedure;

wherein the step (e) further comprises the following steps:
    determining that the random access procedure has been consecutively failed for a specific number of times, wherein the specific number is smaller than a maximum number of preamble transmission; and
    determining whether the time alignment timer is still running when the random access procedure has been consecutively failed for the specific number of times;
    wherein the step (f) is dropping the time alignment timer by stopping the time alignment timer if the time alignment timer is still running.

12. The TA value updating method as claimed in claim 7, wherein after the step (d), the TA value updating method further comprises the following steps:
    notifying a radio resource control (RRC) to release allocated resources of a physical uplink control channel (PUCCH) and a sounding reference symbol (SRS);
    clearing configured downlink assignments and uplink grants; and
    initiating the random access procedure to receive a next TA command from the base station via the transceiver and retrieve a next TA value from the next TA command;
    wherein the step (e) is determining whether the time alignment timer is still running once the next TA value is retrieved from the next TA command;
    wherein the step (f) is dropping the time alignment timer by directly applying the next TA value if the time alignment timer is still running, and after the step (f), the processor further executes the following steps:
    restarting the time alignment timer once the next TA value is applied;
    stopping the time alignment timer when a contention resolution of the random access procedure is not successful;
    applying the TA value; and
    restarting the time alignment timer once the TA value is applied.

* * * * *